(12) United States Patent
Alleysson et al.

(10) Patent No.: US 12,518,123 B2
(45) Date of Patent: Jan. 6, 2026

(54) ASSEMBLY FOR SHIELDING AT LEAST ONE RADIO-FREQUENCY CHIP AND METHOD FOR MAKING THE SAME

(71) Applicant: THALES DIS FRANCE SAS, Meudon (FR)

(72) Inventors: Blandine Alleysson, Aubagne (FR); Elisabeth Kerguen, Aubagne (FR); Sébastien Subra, Auriol (FR); Sébastien Gaspari, Marseilles (FR); Claude Costanza, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/257,108

(22) PCT Filed: Dec. 15, 2021

(86) PCT No.: PCT/EP2021/085830
§ 371 (c)(1),
(2) Date: Jun. 13, 2023

(87) PCT Pub. No.: WO2022/129129
PCT Pub. Date: Jun. 23, 2022

(65) Prior Publication Data
US 2024/0104329 A1    Mar. 28, 2024

(30) Foreign Application Priority Data

Dec. 16, 2020  (EP) .................................. 20306586

(51) Int. Cl.
*G06K 19/073*   (2006.01)
(52) U.S. Cl.
CPC .............................. *G06K 19/07318* (2013.01)

(58) Field of Classification Search
CPC ......... G06K 19/07327; G06K 7/10316; G06K 19/025; G06K 13/0862; G06K 7/10158;
(Continued)

(56) References Cited

U.S. PATENT DOCUMENTS 11,755,873 B1 *   9/2023  Finn .................. G06K 19/07749
                                                              235/492
2006/0254815 A1 * 11/2006  Humphrey ............... H05K 9/00
                                                              174/378
(Continued)

FOREIGN PATENT DOCUMENTS

AU       2011211382 A1       9/2011
DE   102007039774 A1 *   4/2009   .......... A45C 11/182
(Continued)

OTHER PUBLICATIONS

Jakubovic, "Ionic mobilities in ion-exchange resins. Part 2.—Electrical conductivities of phenolsulphonic resins" (Year: 1959).*
(Continued)

*Primary Examiner* — Thien T Mai (57) ABSTRACT

Provided is an assembly that includes a first shield part and a second shield part. The first shield part is foldable on the second shield part. Each of the first shield part and the second shield part includes or is connected to at least one closure element, so that the at least one closure element associated with the first shield part is in contact with at least one corresponding closure element associated with the second shield part. The contact allows ensuring an electrical continuity between the first shield part and the second shield part and generating a Faraday cage. Other embodiments disclosed.

11 Claims, 3 Drawing Sheets

(58) Field of Classification Search
CPC ....... G06K 19/07758; G06K 19/07318; G06K 19/07779; G06K 19/07786; G06K 19/0723; G06K 19/005; G06K 19/07749; A45C 11/182; A45C 1/06; A45C 11/00; A45C 13/002; A45C 13/10; H05K 9/00
See application file for complete search history.

(56) References Cited

U.S. PATENT DOCUMENTS

2019/0138763 A1\* 5/2019 Colby .................... G07G 1/009
2020/0229327 A1\* 7/2020 Judy ..................... H05K 9/0015

FOREIGN PATENT DOCUMENTS

JP           4093893 B2 \*  6/2008   .............. F21V 23/02
WO    WO-2017012834 A1 \*  1/2017   .............. F21V 23/02

OTHER PUBLICATIONS

Crossing Borders: Security and Privacy Issues of the European e-Passport (Year: 2006).\*

International Search Report (PCT/ISA/210) and Written Opinion (PCT/ISA/237) mailed on Apr. 5, 2022, by the European Patent Office as the International Searching Authority for current International Application No. PCT/EP2021/085830—[12 pages].

\* cited by examiner

ASSEMBLY FOR SHIELDING AT LEAST ONE RADIO-FREQUENCY CHIP AND METHOD FOR MAKING THE SAME

FIELD

The invention relates generally to an assembly for shielding at least one Radio-Frequency (or RF) chip.

The RF chip(s) include(s) one or several Near Field Communication (or NFC) type chips, as a Secure Element(s) (or SE), that are incorporated in a security document, such as an electronic passport or termed e-passport.

Within the present description, an SE is a smart object that, on one hand, protects access to data that the smart object stores or processes and, on another hand, is intended to communicate with a reader, like e.g., a gate, a Personal Computer (or PC), a tablet or a mobile (tele)phone.

Furthermore, the invention pertains to a method for making an assembly for shielding at least one RF chip.

BACKGROUND

US 2008/0186186 A1 describes a shield that allows shielding an RF chip. The shield includes a flexible non-metallic substrate that has a metallic coating. The shield may be incorporated in or adhesively adhered to an article with an RF chip.

However, such a shield is not efficient enough in terms of blocking an RF signal(s) that is(are) sent to the RF chip or that originate(s) from the RF chip.

There is a need for a solution that allows improving a provided RF shielding efficiency.

SUMMARY

The invention proposes a solution for satisfying the just herein above specified need by providing an assembly including a shield.

According to the invention, an assembly includes a shield. The shield includes a first shield part and a second shield part. The first shield part is foldable on the second shield part. Each of the first shield part and the second shield part includes or is connected to at least one closure element, so that the at least one closure element associated with the first shield part is in contact with at least one corresponding closure element associated with the second shield part. The contact allows ensuring an electrical continuity between the first shield part and the second shield part and generating a Faraday cage.

The principle of the invention consists in a shield with two shield parts, namely a first shield part and a second shield part. The first shield part can be folded on the second shield part. Each of the first and second shield parts incorporate(s) or is(are) attached (or connected) to one or several closure elements. To obtain an electrical continuity between the shield parts and thus create a Faraday shield, the first and second shield parts are folded onto each other so that each of the closure element(s) associated with one shield part get(s) in (electrical) contact with a corresponding closure element(s) that is(are) associated with another shield part.

Once the closure elements are in a closed position, the shield is electrically closed through the first shield part, the second shield part and the closure elements.

The invention assembly allows securing RF access from and/or to an RF chip(s) included between the first and second shield parts (once brought together). The RF chip(s) is(are) included in a product or an article that includes or is bound to the assembly.

Once the shield parts are brought together, one or several RF chips that are sandwiched between the closed shield parts are thus electromagnetically isolated from the outside.

The invention assembly allows, thanks to an electrical closure between the shield parts, preventing from any passage of any RF signal between the inside and the outside of a resulting (electrically) closed assembly.

The invention assembly is technically simple and efficient against a passage of any RF signal between the inside and the outside of the resulting closed assembly.

Contrary to the aforementioned prior art solution, the invention assembly allows blocking an RF signal(s) that is(are) sent to and/or that originate(s) from an RF chip(s) that is(are) located within a space walled or surrounded at least in part by the shield parts (once brought together).

The invention assembly allows thus improving a provided RF shielding efficiency.

According to a further aspect of the invention, the invention is a method for making an assembly.

According to the invention, the method includes:

providing a shield, the shield including a first shield part and a second shield part, the first shield part being foldable on the second shield part;

providing, each of the first shield part and the second shield part, with at least one closure element, so that the at least one closure element associated with the first shield part is in contact with at least one corresponding closure element associated with the second shield part, the contact allowing to ensure an electrical continuity between the first shield part and the second shield part and to generate a Faraday cage.

BRIEF DESCRIPTION OF THE DRAWINGS

Additional features and advantages of the invention will be apparent from a detailed description of a plurality of invention embodiments, given as indicative and non-limitative examples, in conjunction with the following drawings.

DETAILED DESCRIPTION

Herein under is considered a case in which the invention assembly is used for shielding a single RF chip that is included in a product or an article.

However, the invention assembly is also valid for shielding a plurality of RF chips that are included in a product or an article.

The invention assembly may be used in any type of product or article, such as a security document, like e.g., an e-passport, an electronic driving license or an electronic identity card.

Naturally, the herein below described embodiments are only for exemplifying purposes and are not considered to reduce the scope of the invention.

The same references that are present in different figures refer to the same features.

Figure 1:
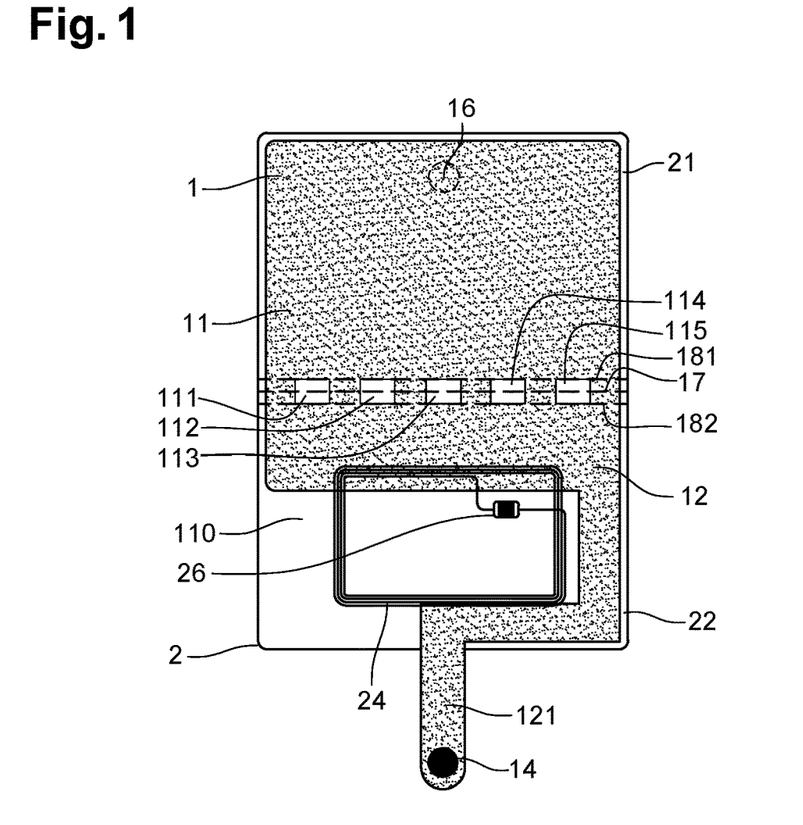
FIG. 1 is a top view of an assembly including a shield with two shield parts, one with one magnetized element, as a first closure element, and the other one with a corresponding magnetically attractable element, as a second closure element, that are used for closing the shield and shielding an RF chip included in or bound to an article, according to a first assembly embodiment.

FIG. 1 shows schematically an assembly 1 for shielding one RF chip 26 and a cover 2 of an article, such as e.g., a booklet type product.

The article is opened on the FIG. 1.

The cover 2 is made of one or several materials which are not electrically conductive. The cover material(s) may include paper, plastic, leather and/or (an)other non-conductive material(s).

The cover 2 has a front side (not visible on FIG. 1) and a back side. The cover back side is only partly visible on the exterior edges of the cover 2.

The cover 2 includes a first cover part 21 and a second cover part 22.

The first cover part 21 is bound to the second cover part 22.

The first cover part 21 can be folded along a fold line 17 onto the second cover part 22.

A chip (module) 26, as an RF chip, is connected to or communicatively coupled to an antenna 24.

The antenna 24 and the chip 26 are preferably both located in an interior of the article.

The antenna 24 may have one or several turns. The turns may surround the chip 26.

The antenna 24 and the chip 26 are included or attached to e.g., the second cover part 22. The antenna 24 and the chip 26 are represented by transparency on FIG. 1 but are typically hidden when they are incorporated in or attached to one or several materials that are included in the article. The antenna 24 and the chip 26 are preferably not accessible to a user of the article.

The chip 26 includes a Central Processing Unit (or CPU), as data processing means (not represented), one or several memories, as data storing means (not represented), one or several Input/Output (or I/O) interfaces (not represented) which are internally connected together through a data and control bus (not represented).

The I/O interface(s) is(are) used for exchanging data with the outside world.

The chip memory(ies) store(s) data, like e.g., one or several cryptographic keys, which is secret and has to be kept only internally. The data includes some data items, such as e.g., user data, which is sensitive and is authorized to be read, from outside, only by one or several authorized readers.

The chip memory(ies) store(s) one or several Contact-Less (or CL) applications, as executable data to be executed by a chip CPU and/or (micro)processor(s), so as to provide a corresponding CL service(s).

Within the present description, the used adjective "CL" within notably the expression "CL applications" means notably that the application(s) is(are) accessible via a Short Range (or SR) RF link(s) by using, for example, International Standardization Organization/International Electrotechnical Commission (or ISO/IEC) 14 443 specifications, a Ultra High Frequency RF IDentification (or UHF RFID) technology or the like.

The CL service(s) may include an e-government type service(s), a banking/finance type service(s), a mobile communication type service(s), a loyalty type service(s), a ticketing type service(s), a transportation type service(s), a payment type service(s) and/or an information type service(s). Such a set of CL services is not exhaustive. The CL service(s) may include any type of service(s) accessible in a CL fashion.

The chip 26 may be read by an external CL reader(s) (not represented) or the like, which is sufficiently closed to the chip 26, so as to exchange with the chip 26.

In a transponder mode, i.e. when the chip 26 is powered at least in part by an external CL reader, the chip 26 receives power from the CL reader and provides power to its internal components, so as to operate.

Alternately or additionally, the chip 26 is powered by a battery (not represented) that is connected to the chip 26. The battery is included in or attached to e.g., the first cover part 21 or the second cover part 22.

The antenna 24 is used for sending and/or receiving data, over an SR RF link(s) (not represented), to and/or from an external CL reader(s).

The frequency of the SR RF link(s) may be fixed at, e.g., 13.56 MHz.

To make the assembly 1 shield an RF chip (or a plurality of RF chips), a shield is provided. The shield is electrically conductive.

The shield includes preferably a first shield part 11 and a second shield part 12.

Each of the first shield part 11 and the second shield part 12 includes one or several magnetized layers, one or several metallic layers, one or several magnetized coatings, one or several metallic coatings, one or several conductive coatings, one or several silk screen printings and/or one or several conductive layers.

The metal that may be used in a metallic layer(s) or a metallic coating(s) may include, among others, aluminium, copper, nickel, chromium and/or silver.

The first shield part 11 and the second shield part 12 are both electrically conductive.

The first shield part 11 is adapted to be incorporated (or included) in or attached to e.g., the first cover part 21.

The first shield part 11 may overlap e.g., almost an overall area covered by the first cover part 21.

The second shield part 12 is arranged to be incorporated (or included) in or attached to e.g., the second cover part 22.

The first shield part 11 is bound to the second shield part 12, through one or several wires or stripes 116 and 117.

The wires or stripes 116 and 117 are electrically conductive.

The wires or stripes 116 and 117 may be positioned at the fold line 17 possibly at the opposite edges of the first shield part 11 and the second shield part 12.

The first shield part 11 is preferably foldable onto the second shield part 12.

The first shield part 11 and the second shield part 12 are presented, in the FIG. 1, on one and the same plane (and are therefore not folded onto each other).

Each of the first shield part 11 and the second shield part 12 is preferably provided with one or several (electrical) closure elements 14 and 16.

Additionally and/or instead of being incorporated in the first shield part 11 and/or the second shield part 12, the closure elements are at least in part separate from the first shield part 11 and/or the second shield part 12 while being electrically connected to the first shield part 11 and the second shield part 12 respectively in a closed position. For example, a first closure element is included in the second cover part 22 (possibly in a strip that extends from the second cover part 22) while being electrically connected, possibly through an electrical wire or stripe, to the second shield part 12 and/or a second closure element is included in the first cover part 21 while being electrically connected, possibly through an electrical wire or stripe, to the first shield part 11. The first closure element and the second closure element cooperate with each other in an electrically closed position, so as to close a circuit including the first and second shield parts.

The first 16 and second 14 closure elements are electrically conductive.

Each of the first and second closure element 14 or 16 included in or connected to (or associated with) the second shield part 12 or the first shield part 11 allows contacting electrically a corresponding closure element 16 or 14 included in or connected to (or associated with) the first shield part 11 or the second shield part 12.

It is to be noted that the first shield part 11 and the second shield part 12 may have, each, different shapes and locations without any significant impact on the shielding efficiency of the assembly 1.

The second shield part 12 may include a strip 121 that is electrically conductive. The strip 121 may be extended, so as to extend outside of the second cover part 22 and be foldable onto the other side of the first cover part 21. The strip 121 may include or be connected to a magnetized element 14, like e.g., a magnet, as a first closure element.

The magnetized element 14 is provided on or associated with e.g., the second shield part 12.

The magnetized element 14 is e.g., incorporated in or glued or attached to the second shield part 12.

The magnetized element 14 is configured to interact with e.g., a metallic (or metalized) element 16 (or another magnetized element (not represented in FIG. 1)), as a second closure element, so as to close electrically the first shield part 11 with the second shield part 12.

The metallic element 16 is provided on or associated with e.g., the first shield part 11.

Alternatively or additionally, at least one of the first shield part 11 and the second shield part 12 include(s) or is(are) connected to one or several mechanical elements (not represented). Each of the mechanical elements cooperates preferably with at least one corresponding mechanical element provided on the second shield part 12 and the first shield part 11 respectively. A mechanical element may include a female mechanical element and a corresponding mechanical element may include a male mechanical element. One example of corresponding female and male mechanical elements are a snap button, as known per se. The mechanical elements are electrically conductive. The mechanical elements constitute closure elements and are intended to cooperate or interact mechanically with each other, so as to close and maintain a corresponding Faraday shield in a closed position.

The magnetized element 14 and the metallic element 16 do not cooperate magnetically on FIG. 1 in a position that is opened.

The magnetized element 14 and the metallic element 16 are intended to cooperate magnetically with each other, so as to close and maintain a corresponding Faraday shield in such a closed position.

The shield, more exactly the first shield part 11 and/or the second shield part 12, includes preferably one or several apertures 110, 111, 112, 113, 114 and 115.

Each aperture 110, 111, 112, 113, 114 or 115 is deprived of any material and constitutes a through hole.

Each aperture 110, 111, 112, 113, 114 or 115 allows reducing the quantity of the material(s) that is(are) used to constitute the shield. Each aperture 110, 111, 112, 113, 114 or 115 allow(s) reducing the cost for the corresponding shield without impacting the shielding efficiency of the assembly 1.

The aperture(s) may include one or several apertures 111, 112, 113, 114 and 115 that face(s) at least in part a folding area, namely the folding area represented between dashed lines 181 and 182 around the fold line 17, between the first shield part 11 and the second shield part 12.

It is to be noted that the count and the shape of the aperture(s) that is(are) present at the folding area have no significant impact on the shielding efficiency of the assembly 1.

The aperture(s) may include an aperture 110 that is present in e.g., the second shield part 12, at an antenna area.

The second shield part 12 overlaps e.g., at least in part the antenna 24.

The second shield part 12 may overlap e.g., at most around 30 percent of an overall area covered by the antenna 24.

The assembly 1 for shielding the RF chip 26 is presented in a position that is electrically opened.

Figure 2:
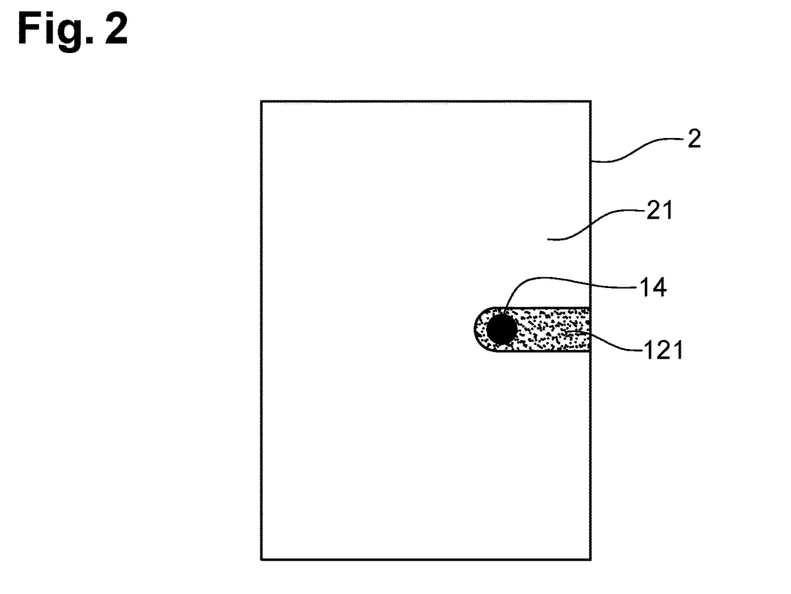
FIG. 2 is a top view of from an exterior of the article that is closed using the two closure elements of FIG. 1, the shield being electrically closed, according to the first assembly embodiment.

FIG. 2 shows schematically the assembly 1 for shielding the RF chip 26 and the article cover 2.

The assembly 1 for shielding the RF chip 26 is presented in a position that is electrically closed.

The user has closed the article folding the second shield part 12 onto the first shield part 11 while possibly handling the strip 121 and bringing together the magnetized element 14 and the metallic element 16, as first and second closure elements.

The strip 121 that extends from the second shield part 12 is folded or bent to the cover 2 front side, as the other side of the first cover part 21.

The first shield part 11 is folded, preferably along the fold line 17, onto the second shield part 12. The first shield part 11 is thus not electrically in contact with the second shield part 12.

The antenna 24 and the chip 26 are sandwiched between the first shield part 11 and the second shield part 12.

The first and second closure elements 14 and 16 are electrically conductive.

The metallic element 16 (hidden on FIG. 1) faces the magnetized element 14 when the user has brought together the first shield part 11 and the second shield part 12 (and therefore the first cover part 21 and the second cover part 22).

When the magnetized element 14 and the metallic element 16 are sufficiently close to each other, the magnetized element 14 exerts a magnetic and attractive force onto the metallic element 16.

The magnetized element 14 and the metallic element 16 cooperate with each other in a magnetic fashion.

The magnetized element 14 and the metallic element 16, as a magnetically attractable element, are closed in an electric fashion, i.e. are in an electrical contact.

The electrical contact between the first 16 and second 14 closure elements allows ensuring an electrical continuity between the first shield part 11 and the second shield part 12 and generating a Faraday cage or shield. The Faraday shield allows thus blocking any RF signal that is(are) sent to the chip 26 and blocking any RF signal that originate(s) from the chip 26.

The magnetized element 14 and the metallic element 16, as closure elements, close electrically the thus formed Faraday shield. The Faraday shield allows blocking incoming and outgoing electromagnetic fields.

A conductance of the shield, namely the first shield part 11 and the second shield part 12 electrically closed together thanks to the magnetized element 14 and the metallic element 16, as closure elements, is greater than a conductance of the antenna 24.

The shield allows, when the shield is electrically closed, shielding against an RF signal transmitted to the antenna 24 with an electromagnetic field strength that is included in a range between about 1.5 Nm and about 8.5 A/m. In such an electrically closed position, the shield prevents the RF chip 26 from communicating with any external CL reader.

Maintaining, in a closed position, the article allows generating a Faraday shield by electrically closing, based on the closure elements 14 and 16 provided on the first 11 and second 12 shield parts, the first 11 and second 12 shield parts.

Maintaining, in a closed position, the article allows preserving a flatness of its cover, its inner sheet(s) and/or its data page and therefore reducing a warpage issue or a risk to deform its cover, its inner sheet(s) and/or its data page.

The user of the article using the invention assembly may select to either authorize by opening the article or deny by closing the article access to the RF chip 26.

Figures 3, 4:
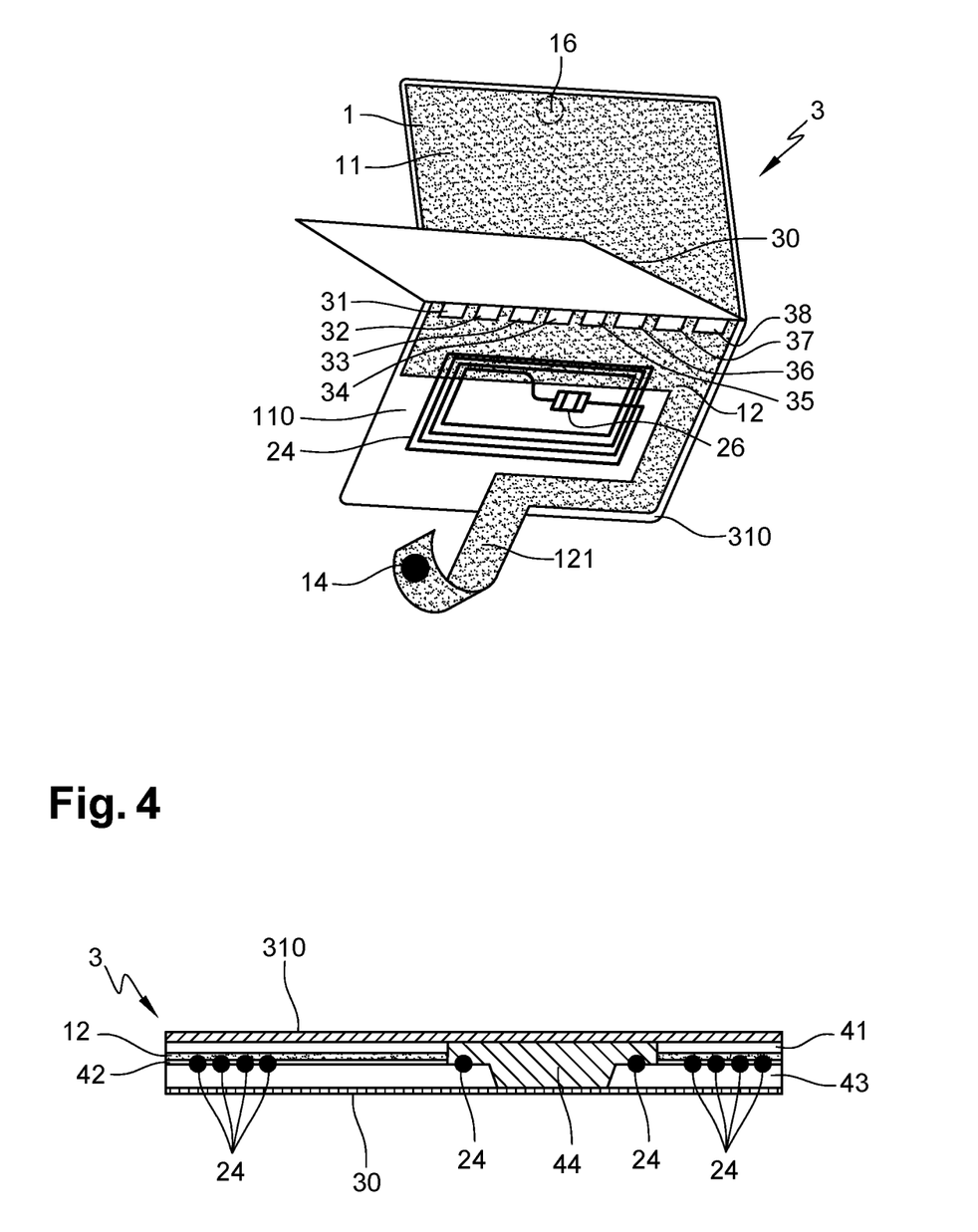
FIG. 3 is an internal view of an assembly including a shield with two shield parts, one with one magnetized element, as a first closure element, and the other one with a corresponding magnetically attractable element, as a second closure element, that are used for closing the shield and shielding an RF chip included in or bound to an e-passport, according to a second assembly embodiment.
FIG. 4 is a truncated and reversed cross-sectional view along a section A-A line of FIG. 3 when the e-passport is closed using the two closure elements of FIG. 3.

FIG. 3 presents schematically the assembly 1 for shielding the RF chip 26 and an e-passport 3, as a particular article, that is represented in a simplified manner.

The e-passport 3 incorporates (or is attached to) the first shield part 11 and the second shield part 12.

The second shield part 12 is associated with a second cover part 310.

The second cover part 310 is not electrically conductive.

For a sake of simplicity, the e-passport 3 includes only one sheet 30. However, the e-passport 3 may include a plurality of sheets (not represented).

Each sheet 30 is made in e.g., paper. Each sheet 30 is not electrically conductive. Each sheet 30 is attached to the e-passport 3 through a hinge (not visible on FIG. 3).

The hinge allows attaching one or several sheets 30 and a data page that are included in the e-passport 3.

The hinge may include e.g., filaments that cross each other to form a grid. The hinge is not electrically conductive. The hinge faces typically a folding area of the e-passport 3.

The first shield part 11 and the second shield part 12 include, e.g., eight apertures 31, 32, 33, 34, 35, 36, 37 and 38, at the folding area between the first shield part 11 and the second shield part 12.

A count of aperture(s) at the folding area between the first shield part 11 and the second shield part 12 may be greater than one without impacting the shielding efficiency in a closed position. Each aperture 31, 32, 33, 34, 35, 36, 37 or 38 is bordered by at least one wire and/or at least one stripe. The wire(s) and/or the stripe(s) which border each aperture 31, 32, 33, 34, 35, 36, 37 or 38 is(are) electrically conductive.

The second shield part 12 includes the aperture 110. The aperture 110 faces at least 70% of an area covered by the antenna 24.

The strip 121 is preferably flexible, so as to be bent or curved onto the front side of the e-passport 3.

The magnetized element 14 that is associated, through the strip 121, with the second shield part 12 is electrically connectable to the corresponding metallic element 16.

The magnetic and attractive force that is exerted by the magnetized element 14 may be equivalent to a weight of at least about 150 g for the e-passport 3, so as to close and maintain the e-passport 3 in an electrically closed position.

The assembly 1 includes a cross-section line A-A. The cross-section line A-A horizontally crosses the e-passport 3 along its length and at about its middle in about its semi width.

The assembly 1 for shielding the RF chip 26 is presented in a position that is electrically opened.

FIG. 4 shows schematically and partially, along the cross-section line A-A of the FIG. 3, an interior of the e-passport 3.

The e-passport 3 includes, in one (or several) substrate element(s), the second shield part 12.

More exactly, the e-passport 3 includes, from the top to the bottom, e.g., the second cover part 310, a first inlay layer 41, mostly in the background the second shield part 12, an adhesive layer 42, a second inlay layer 43 and the sheet 30.

The first inlay layer 41 constitutes a top inlay layer.

The second inlay layer 43 constitutes a bottom inlay layer.

Each of the first inlay layer 41 and the second inlay layer 43 is made e.g., in Teslin (registered Trademark).

The first inlay layer 41 and the second inlay layer 43 are not electrically conductive.

The e-passport 3 includes further, in the foreground, a hole 44, the chip (not visible on FIG. 4) and a plurality of wires 24 which are included in the antenna 24.

The hole 44 allows accommodating the chip 26. The chip 26 is connected, through two wires that are e.g., soldered to the module that is internally connected to the chip.

The chip 26 is included e.g., in the first inlay layer 41, as a top inlay layer and a first substrate element.

The adhesive layer 42 covers e.g., an area covered by the second cover part 310.

The adhesive layer 42 is not electrically conductive.

The adhesive layer 42 allows attaching the antenna 24 to the second shield part 12.

The adhesive layer 42 allows preferably collating the first inlay layer 41 and the second inlay layer 43.

The antenna 24 is included e.g., in the second inlay layer 41 and a first substrate element.

The antenna 24 and the chip 26 are included within e.g., two different layers or the like, as two (or more) different substrate elements, of e.g., a data page.

In another embodiment (not represented), the antenna 24 and the chip 26 are both included e.g., in one and the same substrate element.

The second shield part 12 has a thickness that is included in a first range between about 5 μm and about 100 μm. The second shield part 12 has preferably a thickness that is included in a second range between about 30 µm and about 45 µm.

The first shield part 11 (not visible on FIG. 4) has a thickness that is either equal or distinct from the second shield part 12 thickness.

The second shield part 12 is sandwiched or walled between the first inlay layer 41 and the adhesive layer 42, as two different substrate elements.

The second shield part 12 and/or the first shield part 11 are inserted between two different substrate elements, such as e.g., two inlay layers, an inlay layer and a cover part, a cover and an inner sheet, two sheets or the like.

The second shield part 12 remains electrically isolated from the antenna 24 and the chip 26.

Figure 5:
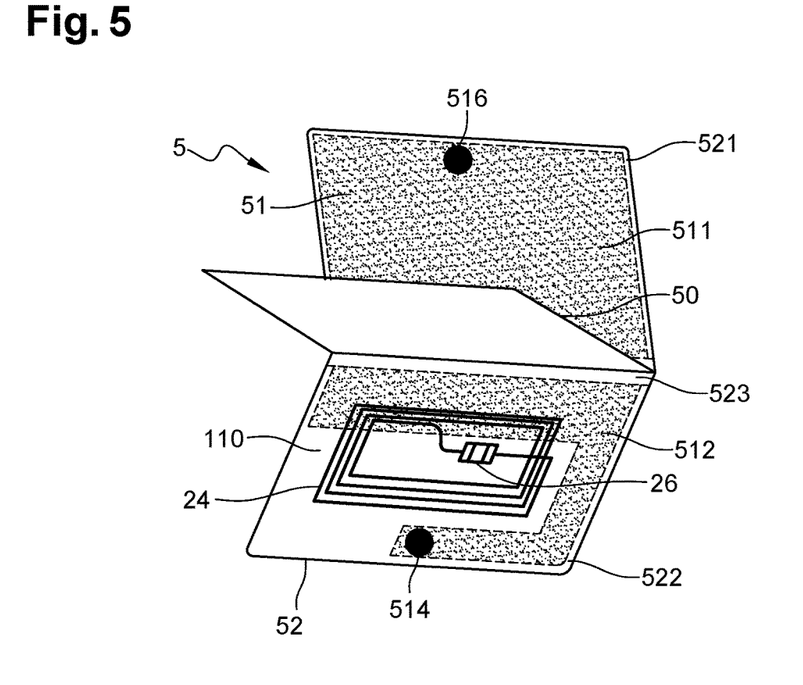
FIG. 5 is an internal view of an assembly including a shield with two shield parts, each, with a magnetized element, as a closure element, that are used for closing the shield and for shielding an RF chip included in or bound to an e-passport, according to a third assembly embodiment.

FIG. 5 shows schematically an assembly 51 for shielding one RF chip 26 and an e-passport 5 with a cover 52.

The assembly 51 for shielding the RF chip 26 is presented in one position that is electrically opened.

The cover 52 includes a first cover part 521 and a second cover part 522.

The first cover part 521 is bound to the second cover part 522.

The first cover part 521 can be folded along a fold line onto the second cover part 522.

The e-passport 3 incorporates (or is attached to) the shield 51 that includes a first shield part 511 and a second shield part 512.

The second shield part 512 is associated with the second cover part 522.

The second cover part 522 is not electrically conductive.

For a sake of simplicity, the e-passport 3 includes only one sheet 50. However, the e-passport 3 may include a plurality of sheets (not represented).

Each sheet 50 is made in e.g., paper. Each sheet 50 is not electrically conductive. Each sheet 50 is attached to the e-passport 3 through a hinge (not visible on FIG. 5).

The hinge allows attaching one or several sheets 50 and a data page that are included in the e-passport 5.

The hinge is not electrically conductive. The hinge faces typically a folding area of the e-passport 5.

The shield 51 includes a first shield part 511 and a second shield part 512.

The first shield part 511 is adapted to be incorporated (or included) in or attached to e.g., the first cover part 521.

The first shield part 511 may overlap e.g., almost an overall area covered by the first cover part 521.

The second shield part 512 is arranged to be incorporated (or included) in or attached to e.g., the second cover part 522 (or the data page).

The first shield part 511 is bound to the second shield part 512, through e.g. two wires or stripes (not represented) that are electrically conductive.

The wires or stripes may be positioned at the fold line possibly at the opposite edges of the first shield part 511 and the second shield part 512.

The first shield part 511 is preferably foldable onto the second shield part 512.

The first shield part 511 and the second shield part 512 are presented, on the FIG. 5, with an angle of about 90 degrees between their respective planes.

The first shield part 511 and the second shield part 512 are, each, provided with e.g., one magnetized element 514 or 516, as an (electrical) closure element 514 and 516 respectively. To provide each of the first shield part 511 and the second shield part 512 with an associated closure element 514 or 516, a first magnet 514, as a first magnetized element 514, and a second magnet 516, as a second magnetized element 516, may be glued or attached to (or incorporated in) the first shield part 511 or the second shield part 512 respectively.

The first 514 and second 516 closure elements are electrically conductive.

Each of the first and second closure element 514 or 516 bound to (or included in or associated with) the second shield part 512 or the first shield part 511 allows contacting electrically the other of the first and second closure element 516 or 514 bound to (or included in or associated with) the first shield part 511 or the second shield part 512.

The second shield part 512 does not include any strip that is electrically conductive, so as to support the first magnetized element 514, as the first closure element.

The first magnetized element 514 is provided on or associated with e.g., the second shield part 512 (without any (extension) strip).

The first magnetized element 514 is configured to interact with e.g., the second magnetized element 516, as the second closure element, so as to close electrically the second shield part 512 with the first shield part 511.

The first magnetized element 514 and the second magnetized element 516 do not cooperate magnetically on FIG. 5 in an opened position.

The first magnetized element 514 and the second magnetized element 516 are intended to cooperate magnetically with each other, so as to close and maintain the Faraday shield in a closed position.

Alternatively or additionally, the first shield part 511 and/or the second shield part 512 include(s) (or is(are) connected to) one or several mechanical elements (not represented). Each of the mechanical elements provided on the first shield part 511 and the second shield part 512 cooperates preferably with at least one other corresponding mechanical element provided on the second shield part 512 and the first shield part 511 respectively. The mechanical elements are electrically conductive. The mechanical elements constitute (electrical) closure elements that are intended to cooperate or interact mechanically with each other in a closed position.

The shield, more exactly the first shield part 511 and/or the second shield part 512, includes one or several apertures 523 and/or 110.

The aperture(s) include(s) preferably e.g., one single aperture 523 (or several apertures) at the folding area between the first shield part 511 and the second shield part 512, and/or the aperture 110 in e.g., the second shield part 512 at the antenna area.

Each aperture 523 or 110 allows reducing the cost for the corresponding shield without impacting the shielding efficiency of the assembly 51.

Figure 6:
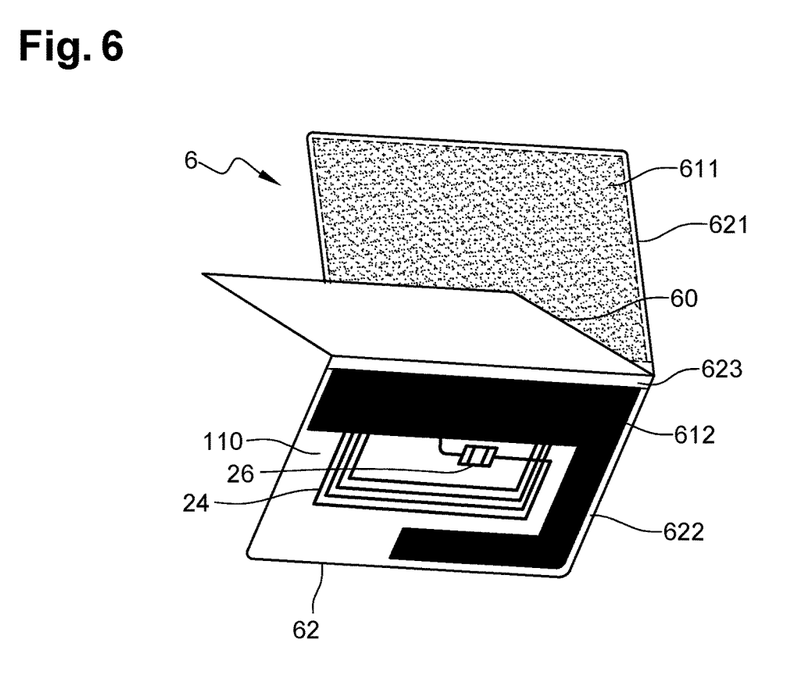
FIG. 6 is an internal view of an assembly including a shield with a first shield part with a magnetically attractable element, as a first closure element, and a second shield part that is magnetized, as a second closure element, that are used for closing the shield and for shielding an RF chip, according to a fourth assembly embodiment.

FIG. 6 shows schematically an assembly 61 for shielding one RF chip 26 and an e-passport 6 with a cover 62.

The assembly 61 for shielding the RF chip 26 is presented in one position that is electrically opened.

The cover 62 includes a first cover part 621 and a second cover part 622.

The first cover part 621 is bound to the second cover part 622.

The first cover part 621 can be folded along a fold line onto the second cover part 622.

The e-passport 6 incorporates (or is attached to) the shield 61 that includes a first shield part 611 and a second shield part 612.

The first shield part 611 is associated with the second cover part 621.

The second shield part 612 is associated with the second cover part 622.

The second cover part 622 is not electrically conductive.

For a sake of simplicity, the e-passport 6 includes only one sheet 60. However, the e-passport 6 may include a plurality of sheets (not represented).

Each sheet 60 is made in e.g., paper. Each sheet 60 is not electrically conductive. Each sheet 60 is attached to the e-passport 6 through a hinge (not visible on FIG. 6).

The hinge allows attaching one or several sheets 60 and a data page that are included in the e-passport 6.

The hinge is not electrically conductive. The hinge faces typically a folding area of the e-passport 6.

The shield 61 includes a first shield part 611 and a second shield part 612.

The first shield part 611 is adapted to be incorporated (or included) in or attached to e.g., the first cover part 621.

The first shield part 611 may overlap e.g., almost an overall area covered by the first cover part 621.

The second shield part 612 is arranged to be incorporated (or included) in or attached to e.g., the second cover part 622 (or the data page).

The first shield part 611 is bound to the second shield part 612, through e.g. two wires or stripes (not represented) that are electrically conductive.

The wires or stripes may be positioned at the fold line possibly at the opposite edges of the first shield part 611 and the second shield part 612.

The first shield part 611 is preferably foldable onto the second shield part 612.

The first shield part 611 and the second shield part 612 are presented, on the FIG. 6, with an angle of about 90 degrees between their respective planes.

The first shield part 611 and the second shield part 612 constitute e.g., one magnetically attractable element or one magnetized element, as an (electrical) closure element. To provide each of the first shield part 611 and the second shield part 612 with an associated closure element, the second shield part 612 is e.g., at least in part or fully magnetized, and the first shield part 611 is fully coated with a magnetically attractive material(s). The (magnetized) second shield part 612, as a first closure element, plays a role of a magnet while the first shield part 611, as a second closure element, is magnetically attractable, i.e. is able to be magnetically attracted.

The first 612 and second 611 closure elements are electrically conductive.

Each of the first and second closure element 612 or 611 incorporated in (or associated with) the second shield part 612 or the first shield part 611 allows contacting electrically the other of the first and second closure element 611 or 612 incorporated in (or associated with) the first shield part 611 or the second shield part 612.

The second shield part 612 may further include a strip that is electrically conductive and magnetized, as the first closure element.

The magnetized second shield part 612, as a first closure element, is configured to interact with e.g., the magnetically attractable first shield part 611, as a second closure element, so as to close and maintain electrically closed the second shield part 612 with the first shield part 611.

The magnetized second shield part 612 and the magnetically attractable first shield part 611 do not cooperate magnetically on FIG. 6 in an opened position.

The magnetized second shield part 612 and the magnetically attractable first shield part 611 are intended to cooperate magnetically with each other, so as to close and maintain the Faraday shield in a closed position.

Alternatively or additionally, the first shield part 611 and/or the second shield part 612 include(s) (or is(are) connected to) one or several mechanical elements (not represented). Each of the mechanical elements provided on the first shield part 611 and the second shield part 612 cooperates preferably with at least one other corresponding mechanical element provided on the second shield part 612 and the first shield part 611 respectively. The mechanical elements are electrically conductive. The mechanical elements constitute (electrical) closure elements that are intended to cooperate or interact mechanically with each other in a closed position.

The shield, more exactly the first shield part 611 and/or the second shield part 612, includes one or several apertures 623 and/or 110.

The aperture(s) include(s) preferably e.g., one single aperture 623 (or several apertures) at the folding area between the first shield part 611 and the second shield part 612, and/or the aperture 110 in e.g., the second shield part 612 at the antenna area.

Each aperture 623 or 110 allows reducing the cost for the corresponding shield without impacting the shielding efficiency of the assembly 61.

The invention solution uses an assembly that allows closing, based on (electrical) closure elements provided on the shield parts, a corresponding efficient Faraday shield.

The invention solution allows keeping the Faraday shield in an electrically closed position based on the closure elements provided on the shield parts.

The invention solution allows closing perfectly an electrical circuit formed by the shield parts and thus creating an efficient Faraday cage or shield.

The invention solution is(are) simple, electrically efficient and cheap to manufacture.

The invention claimed is:

1. An assembly including a shield, the shield including a first shield part and a second shield part, the first shield part being foldable on the second shield part, each of the first shield part and the second shield part including or being connected to at least one closure element, so that the at least one closure element associated with the first shield part is in contact with at least one corresponding closure element associated with the second shield part, the contact allowing to ensure an electrical continuity between the first shield part and the second shield part and to generate a Faraday cage, wherein the assembly further includes an e-passport-comprising at least one substrate element, at least one antenna and at least one chip, the at least one chip being communicatively coupled to the at least one antenna, the first shield part and/or the second shield part includes at least one aperture, each aperture is deprived of any material and constitutes a through hole, wherein the at least one substrate element is included in a group including at least one inlay, at least one cover, a sheet, and at least one data page and wherein the first shield part or the second shield part is included in or attached to an inlay, a cover, a sheet or a data page, wherein the at least one aperture comprises multiple apertures along a hinge that provides points of attachment between the multiple apertures for one or several sheets and faces a folding area of the assembly between the first shield part and the second shield part, and wherein the at least one cover includes a first cover part and a second cover part, said first shield part is adapted to be incorporated in or attached to the first cover part, the area of said first shield part being overlap to the area of said first cover part.

2. The assembly according to claim 1, wherein the at least one closure element includes or is connected to at least one magnetized element provided on at least one of the first shield part and the second shield part, each of the at least one magnetized element interacting with at least one other magnetized element or at least one metallic element provided on the other of the at least one of the first shield part and the second shield part.

3. The assembly according to claim 1, wherein the at least one closure element includes or is connected to at least one mechanical element provided on at least one of the first shield part and the second shield part, each of the at least one mechanical element cooperating with at least one other mechanical element provided on the other of the at least one of the first shield part and the second shield part.

4. The assembly according to claim 1, wherein the first shield part and the second shield part include at least in part at least one element included in a group including:
  at least one conductive layer;
  at least one magnetized layer;
  at least one metallic layer;
  at least one conductive coating;
  at least one magnetized coating;
  at least one metallic coating;
  at least one silk screen printing.

5. The assembly according to claim 1, wherein the shield has a thickness included in a first range between about 5 μm and about 100 μm or in a second range between about 30 μm and about 45 μm.

6. The assembly according to claim 1, wherein at least one of the at least one substrate element includes or is attached to the first shield part or the second shield part.

7. The assembly according to claim 1, wherein the at least one aperture includes at least one aperture (110) that faces at least 70% of an area covered by the at least one antenna.

8. The assembly according to claim 1, wherein at least one of the first shield part and the second shield part overlaps at least in part the at least one antenna.

9. The assembly according to claim 1, wherein a conductance of the shield is greater than a conductance of the at least one antenna.

10. The assembly according to claim 1, wherein the shield allows, when the shield is closed, shielding against at least one radio-frequency signal transmitted to the at least one antenna with an electromagnetic field strength included in a range between about 1.5 A/m and about 8.5 A/m.

11. A method for making an assembly, including:
providing a shield, the shield including a first shield part and a second shield part, the first shield part being foldable on the second shield part; and
providing, each of the first shield part and the second shield part, with at least one closure element, so that the at least one closure element associated with the first shield part is in contact with at least one corresponding closure element associated with the second shield part, the contact allowing to ensure an electrical continuity between the first shield part and the second shield part and to generate a Faraday cage, wherein the assembly further includes an e-passport comprising at least one substrate element, at least one antenna and at least one chip, the at least one chip being communicatively coupled to the at least one antenna, the first shield part and/or the second shield part includes at least one aperture, each aperture is deprived of any material and constitutes a through hole,
wherein the at least one substrate element is included in a group including at least one inlay, at least one cover, a sheet, and at least one data page and wherein the first shield part or the second shield part is included in or attached to an inlay, a cover, a sheet or a data page, wherein the at least one aperture comprises multiple apertures along a hinge that provides points of attachment between the multiple apertures for one or several sheets and faces a folding area of the assembly between the first shield part and the second shield part, and
wherein the at least one cover includes a first cover part and a second cover part, said first shield part is adapted to be incorporated in or attached to the first cover part, the area of said first shield part being overlap to the area of said first cover part.

\* \* \* \* \*